United States Patent
Ericson et al.

(10) Patent No.: US 10,021,572 B2
(45) Date of Patent: Jul. 10, 2018

(54) RESOURCE SHARING BETWEEN RADIO ACCESS TECHNOLOGIES

(71) Applicant: Telefonaktiebolaget LM Ericsson (publ), Stockholm (SE)

(72) Inventors: Mårten Ericson, Luleå (SE); Jan Christoffersson, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 109 days.

(21) Appl. No.: 15/101,734

(22) PCT Filed: Dec. 4, 2013

(86) PCT No.: PCT/EP2013/075445
§ 371 (c)(1),
(2) Date: Jun. 3, 2016

(87) PCT Pub. No.: WO2015/081992
PCT Pub. Date: Jun. 11, 2015

(65) Prior Publication Data
US 2017/0034706 A1    Feb. 2, 2017

(51) Int. Cl.
*H04W 16/04* (2009.01)
*H04W 72/12* (2009.01)
*H04W 88/10* (2009.01)

(52) U.S. Cl.
CPC ....... *H04W 16/04* (2013.01); *H04W 72/1215* (2013.01); *H04W 88/10* (2013.01)

(58) Field of Classification Search
CPC .. H04W 16/04; H04W 72/1215; H04W 88/10
See application file for complete search history.

(56) References Cited

U.S. PATENT DOCUMENTS

| 9,578,517 | B2 * | 2/2017 | De Pasquale | ......... H04W 16/14 |
| 2011/0077015 | A1 * | 3/2011 | Saily | ...... H04W 16/14 455/450 |
| 2014/0080535 | A1 * | 3/2014 | Gauvreau | ............ H04W 16/14 455/513 |

FOREIGN PATENT DOCUMENTS

| EP | 1 418 782 A1 | 5/2004 |
| WO | 2005/004516 A1 | 1/2005 |
| WO | 2013/093462 A1 | 6/2013 |

OTHER PUBLICATIONS

International Search Report issued in corresponding International application No. PCT/EP2013/075445, dated Aug. 13, 2014, 3 pages.
(Continued)

*Primary Examiner* — Thai Nguyen
(74) *Attorney, Agent, or Firm* — Rothwell, Figg, Ernst & Manbeck, p.c.

(57) ABSTRACT

There is provided adaptive resource sharing between at least two radio access technologies (RATs) in a cell. A network node acquires cell load measurements for at least two RATs in a cell. The network node acquires traffic information for the cell. The network node acquires an indicator of 5 interruption delay parameters for user equipment in the cell. The network node determines filter coefficients based on the acquired traffic information and the acquired indicator. The network node applies a filter with the filter coefficients to the cell load measurements. The network node performs resource sharing between the at least two RATs based on the filtered cell load 10 measurements.

22 Claims, 8 Drawing Sheets

(56) References Cited

OTHER PUBLICATIONS

International Preliminary Report on Patentability issued in corresponding International application No. PCT/EP2013/075445, dated Jun. 7, 2016, 7 pages.

\* cited by examiner

RESOURCE SHARING BETWEEN RADIO ACCESS TECHNOLOGIES

CROSS REFERENCE TO RELATED APPLICATION(S)

This application is a 35 U.S.C. § 371 National Phase Entry Application from PCT/EP2013/075445, filed Dec. 4, 2013, designating the United States, the disclosure of which is incorporated by reference.

TECHNICAL FIELD

Embodiments presented herein relate to resource sharing between radio access technologies, and particularly to a method, a network node, a computer program, and a computer program product for adaptive resource sharing between at least two radio access technologies in a cell.

BACKGROUND

In mobile communication networks, there is always a challenge to obtain good performance and capacity for a given communications protocol, its parameters and the physical environment in which the mobile communication network is deployed.

The demand for spectrum is increasing and frequency bands (such as frequency bands below 1 GHz) are becoming more congested, especially in densely populated urban centers. Spectrum sharing technologies enable the spectrum to be shared between different radio access technologies (RATs). In general terms, spectrum sharing encompasses several techniques; administrative, technical and market based. Spectrum can be shared in several dimensions; time, space and geography. Examples of technologies for spectrum sharing include, but are not limited to inband sharing, leasing and spectrum trading, and use of unlicensed spectrum commons combined with the use of low power radios or advanced radio technologies including ultra-wideband and multi-modal radios.

FIG. 1 schematically illustrates an example of spectrum sharing between a first RAT (denoted RAT-1) allocating carriers 1a and second RAT (denoted RAT-2) allocating carriers 1b; when the load of RAT-1 is high and the load of RAT-2 is low, a bandwidth reallocation is initiated and one carrier of RAT-2 is reallocated to RAT-1. The potential user throughput gain in this example (going from 2 to 3 carriers) is 50%. It may be necessary to deploy radio base stations (RBS), also referred to as network nodes (NN), that can handle more than one RAT simultaneously to enable spectrum sharing. Such an RBS or NN that handles more than one RAT simultaneously may be referred to as a mixed mode multi standard RBS or NN.

FIG. 2 schematically illustrates a second example of spectrum sharing between a first RAT and a second RAT. The top part of the figure illustrates the total sector load 2a, 2b per RAT and the bottom part illustrates the number of carriers 2c, 2d, per RAT. A first RAT is associated with cell load 2a and the number of carriers 2c; a second RAT is associated with cell load 2b and the number of carriers 2d. The cell load 2a, 2b is constantly measured for the RATs. According to the illustrative example, when the load of one RAT is 75% (In FIG. 2 denoted "High_threshold") of the maximum load, and the other RAT has lower load than 25% (In FIG. 2 denoted "Low_threshold"), a spectrum reallocation is performed (in FIG. 2 denoted "Reallocate"). In this example the first RAT associated with cell load 2a is given another carrier (in total 3 carriers). When the cell load 2b once again is above 25%, another reallocation is performed; this time reallocating a carrier back to the second RAT.

However, there is still a need for an improved spectrum sharing between different RATs.

SUMMARY

An object of embodiments herein is to provide improved spectrum sharing between different RATs.

FIG. 3 schematically illustrates a third example of spectrum sharing between a first RAT and a second RAT from a simulation as carried out by the inventors of the enclosed embodiments. The figure illustrates traffic load for user equipment (UE) serving web traffic users. The top part of the figure illustrates the total sector load 3a for a first RAT and the bottom part illustrates the total sector load 3b for a second RAT. As can be seen in the figure, the inventors of the enclosed embodiments have discovered that the algorithm as disclosed above is applied to this scenario it would lead to many bandwidth reallocations back and forth between the first RAT and the second RAT. Such bandwidth reallocation may be undesired since the UEs also have an interruption delay each time a reallocation is done, thus resulting in some of the gain with bandwidth reallocation being disappeared.

The inventors of the enclosed embodiments have through a combination of practical experimentation and theoretical derivation thus discovered that traffic load in a cell (or sector) is not nice and smooth and it may therefore be challenging to measure the current load per RAT in order to make a bandwidth reallocation decision. One reason for this is that the traffic in current communications networks (both cellular and fixed) consists of many small packet transmission and a large variations of the instantaneous bitrate. This is caused by both large variations of the packet arrivals (i.e. time between packets) and the packet sizes.

The inventors of the enclosed embodiments have further realized that spectrum sharing that does not consider how to measure the cell load will not work optimally. In addition, if the spectrum sharing does not consider the interruption delay of the UEs will also not work optimally.

According to a first aspect there is presented a method for adaptive resource sharing between at least two radio access technologies in a cell. The method is performed by a network node. The method comprises acquiring cell load measurements for at least two radio access technologies (RATs) in a cell. The method comprises acquiring traffic information for the cell. The method comprises acquiring an indicator of interruption delay parameters for user equipment in the cell. The method comprises determining filter coefficients based on the acquired traffic information and the acquired indicator. The method comprises applying a filter with the filter coefficients to the cell load measurements. The method comprises performing resource sharing between the at least two RATs based on the filtered cell load measurements.

Advantageously this provides improved spectrum sharing between different RATs.

Advantageously this limits the spectrum reallocations in situations where it is difficult to achieve a benefit from the reallocation; while in other situations this allows more spectrum reallocations, thereby enabling more user throughput gains to be achieved.

Advantageously, this makes the reallocation decisions more optimal, as it takes both current traffic characteristics and the current user capabilities into account.

According to a second aspect there is presented a network node for adaptive resource sharing between at least two radio access technologies in a cell. The network node comprises a processing unit. The processing unit is arranged to acquire cell load measurements for at least two radio access technologies (RATs) in a cell. The processing unit is arranged to acquire traffic information for the cell. The processing unit is arranged to acquire an indicator of interruption delay parameters for user equipment in the cell. The processing unit is arranged to determine filter coefficients based on the acquired traffic information and the acquired indicator. The processing unit is arranged to apply a filter with the filter coefficients to the cell load measurements. The processing unit is arranged to perform resource sharing between the at least two RATs based on the filtered cell load measurements.

According to a third aspect there is presented a computer program for adaptive resource sharing between at least two radio access technologies in a cell, the computer program comprising computer program code which, when run on a network node, causes the network node to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 4:
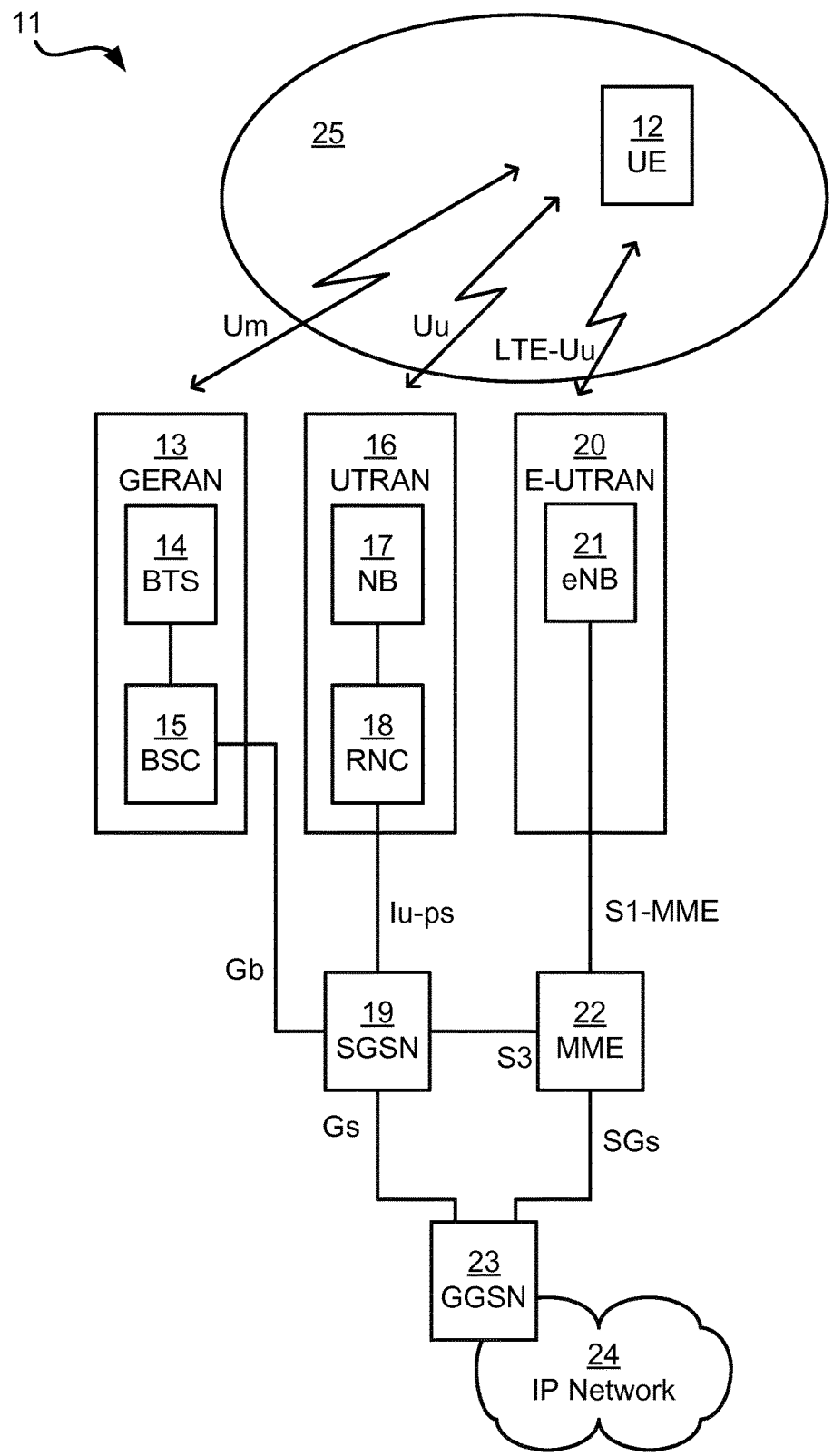
FIG. 4 is a schematic diagram illustrating a communication network according to embodiments.

FIG. 4 is a schematic diagram illustrating a communication network 11. As schematically illustrated in FIG. 4 a user equipment (UE) 12 is enabled to access services and content provided by an Internet Protocol (IP) network 24 in a number of different ways. The UE 12 may be one of a mobile device, a user terminal, a user agent, a mobile phone, a so-called smart phone, a tablet computers, and other handset equipment, etc. As the skilled person understands the number of such available ways to access the network 24 generally depends on the network topology of the actual communication network used and the functionality, capability and compatibility of the UE 12.

According to the communication network 11 of FIG. 4 the UE 12 is enabled to access the IP network 24 by establishing a wireless link to one or more of a base transceiver station (BTS) 14, a NodeB (NB) 17, and an eNodeB, E-UTRAN NodeB, also known as Evolved NodeB, (eNB) 21 providing network coverage in a cell 25. A Radio Access Technology or (RAT) is the underlying physical connection method for a radio based communication network. The UE 12 is arranged to communicate with the BTS 14 over the Um interface. The UE 12 is arranged to communicate with the NB 17 over the Uu interface. The UE 12 is arranged to communicate with the eNB 20 over the LTE-Uu interface.

The communication network 11 is compliant with the Evolved Universal Terrestrial Radio Access Network (E-UTRAN) 20 by means of the eNB 21; typically the E-UTRAN consists only of network nodes in the form of eNBs 21 on the network side.

NodeB (NB) is a term used in UMTS (Universal Mobile Telecommunications System) equivalent to the BTS 14 description used in the Global System for Mobile Communications (GSM). For the NB 17 a radio network controller (RNC) 18 is in the Universal Terrestrial Radio Access Network (UTRAN) 16 located between the NB 17 and the SGSN 19 and the IP network 24. The traditional NB 17 typically has minimum functionality, and is controlled by the RNC 18. The communication network 11 is thus compliant with the UTRAN by means of the NB 17 and the RNC 18.

The BTS 14 is connected to the IP network 24 via a base station controller (BSC) 15 which offers functionality according to the GSM standard in the GSM/EDGE Radio Access Network (GERAN) 13. GERAN is the term given to the second-generation digital cellular GSM radio access technology, including its evolutions in the form of EDGE (Enhanced Data rates for Global Evolution) and, for most purposes, the General Packet Radio Service (GPRS). The communication network 11 is thus compliant with the GSM, EDGE, and GPRS standards by means of the BTS 14 and the BSC 15.

The communication network 11 may thus generally comply with any combination of WCDMA (Wideband Code Division Multiple Access), TD-SCDMA (Time Division Synchronous Code Division Multiple Access), LTE (Long Term Evolution), EDGE (Enhanced Data Rates for GSM Evolution, GPRS (General Packet Radio Service)), CDMA2000 (Code Division Multiple Access 2000), etc., as long as the principles described hereinafter are applicable.

The BSC 15, RNC 18, and eNB 21 are operatively connected to the IP network 24 via a Gateway GPRS support node (GGSN) 23. The BSC 15 and the RNC 18 are connected to the GGSN 23 via a serving GPRS support node (SGSN) 19 by interfaces Gb and Iu-ps, respectively. The eNB 21 is connected to the GGSN 23 via a mobility management entity (MME) 22 by interface S1-MME. The SGSN 19 is connected to the GGSN 23 by interface Gs; the SGSN 19 and the MME 22 are connected by interface S3; the MME 22 is connected to the GGSN 23 by interface SGs.

The BTS 14, BSC 15, NB 17, RNC 18 and eNB 21, will collectively be referred to as network nodes (NN). Hence the UE 12 is arranged to access the IP network 24 by establishing a wireless link complying with a RAT supported by the network node to which the UE 12 is operatively connected. As is understood, the communication network 11 may generally comprise a plurality of network nodes 14, 15, 17, 18, 21 and a plurality of UE 12.

It has by the inventors of the enclosed embodiments been found that spectrum sharing (or bandwidth reallocation) between at least two RATs (as described above) increases the user throughput for traffic with relatively low traffic variations or if the UEs can make a fast reallocation, but not with a very fast traffic variations and UEs with slow reallocations. According to the embodiments presented herein the bandwidth reallocations between two RATs in the same cell is adapted based on the UE capability and the type of data traffic in the cell. Thus, the embodiments presented herein limits the spectrum reallocations in some situations where it may be difficult to achieve a benefit from reallocation as disclosed in the background section; whilst in other situations the embodiments disclosed herein allow more bandwidth reallocations so that more user throughput gains can be achieved.

The embodiments disclosed herein relate to adaptive resource sharing between at least two RATs in a cell. In order to obtain such adaptive resource sharing there is provided a network node, a method performed by the network node, a computer program comprising code, for example in the form of a computer program product, that when run on the network node, causes the network node to perform the method.

Figure 5A:
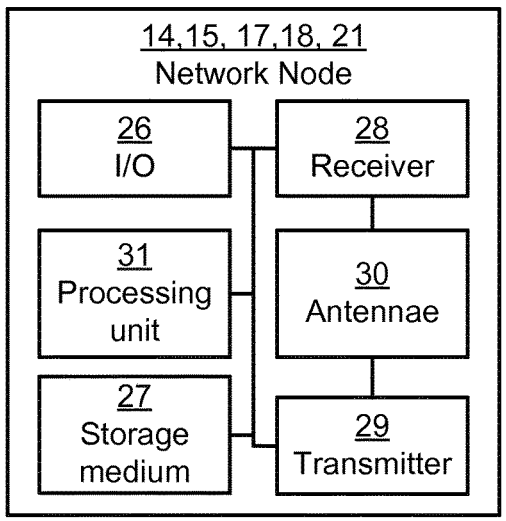
FIG. 5a is a schematic diagram showing functional modules of a network node according to an embodiment.

FIG. 5a schematically illustrates, in terms of a number of functional modules, the components of a network node 14, 15, 17, 18, 21 according to an embodiment. The network node may be a BTS 14, 1 NB 17, or an eNB 21. A processing unit 31 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 32 (as in FIG. 6), e.g. in the form of a storage medium 27. Thus the processing unit 31 is thereby arranged to execute methods as herein disclosed. The a storage medium 27 may also comprise persistent storage, which, for example, can be any single one or combination of magnetic memory, optical memory, solid state memory or even remotely mounted memory. The network node 14, 15, 17, 18, 21 may further comprise a communications interface 26 for communications with a core network and/or other network nodes. The network node 14, 15, 17, 18, 21 may further comprise one or more transmitters 29 and receivers 28, comprising analogue and digital components and a suitable number of antennae 30 for radio communications according to at least one RAT with a UE 12. The processing unit 31 controls the general operation of the network node 14, 15, 17, 18, 21 e.g. by sending data and control signals to the communications interface 26, the storage medium 27, the transmitter 29 and the receiver 28, and by receiving data and reports from the communications interface 22, the transmitter 29 and the receiver 28, and by retrieving data and instructions from the storage medium 27. Other components, as well as the related functionality, of the network node 14, 15, 17, 18, 21 are omitted in order not to obscure the concepts presented herein.

Figure 5B:
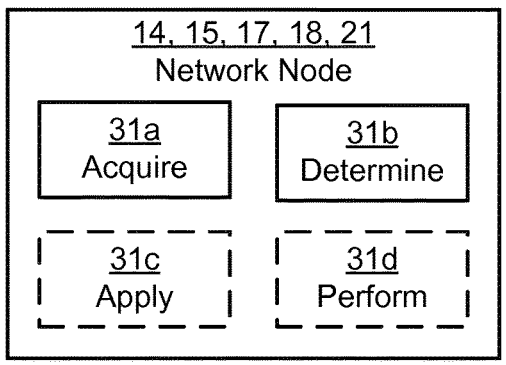
FIG. 5b is a schematic diagram showing functional units of a network node according to an embodiment.

FIG. 5b schematically illustrates, in terms of a number of functional units, the components of a network node 14, 15, 17, 18, 21 according to an embodiment. The network node 14, 15, 17, 18, 21 of FIG. 5b comprises a number of functional units; an acquire unit 31a, an a determine unit 31b. The network node 14, 15, 17, 18, 21 of FIG. 5b may further comprises a number of optional functional units, such as any of an apply unit 31c, and a perform unit 31d. The operations performed by each functional unit 31a-d will be further disclosed below in the context of which the functionality of the functional units 31a-d may be used. For example, herein disclosed steps of acquiring may be performed by executing the functionality of the acquire unit 31a, herein disclosed steps of determining may be performed by executing the functionality of the determine unit 31b, herein disclosed steps of applying may be performed by executing the functionality of the apply unit 31c, and herein disclosed steps of performing may be performed by executing the functionality of the perform unit 31d. In general terms, each functional unit 31a-d may be implemented in hardware or in software. The processing unit 31 may thus be arranged to from the storage medium 27 fetch instructions as provided by a functional unit 31a-d and to execute these instructions, thereby performing any steps as will be disclosed hereinafter.

Figure 6:
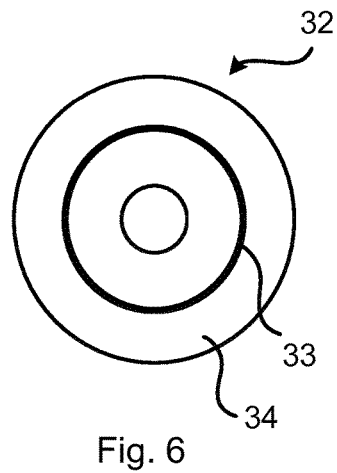
FIG. 6 shows one example of a computer program product comprising computer readable means according to an embodiment.
Figure 7:
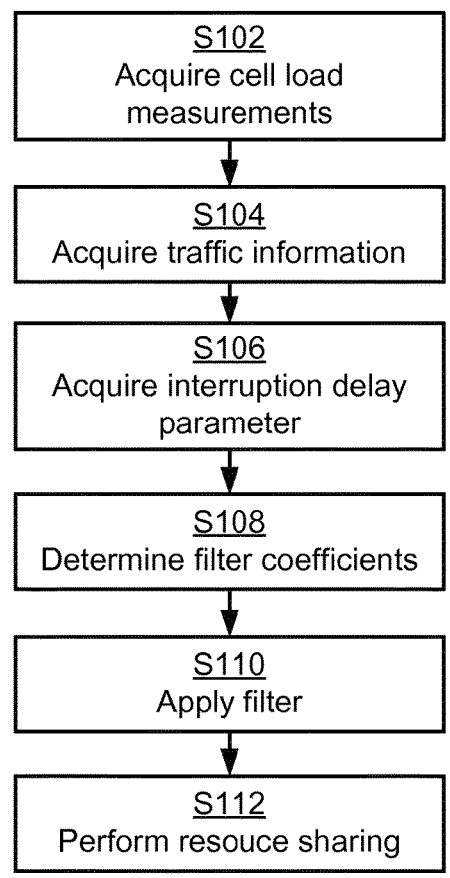
FIGS. 7 and 8 are flowcharts of methods according to embodiments.
Figure 8:
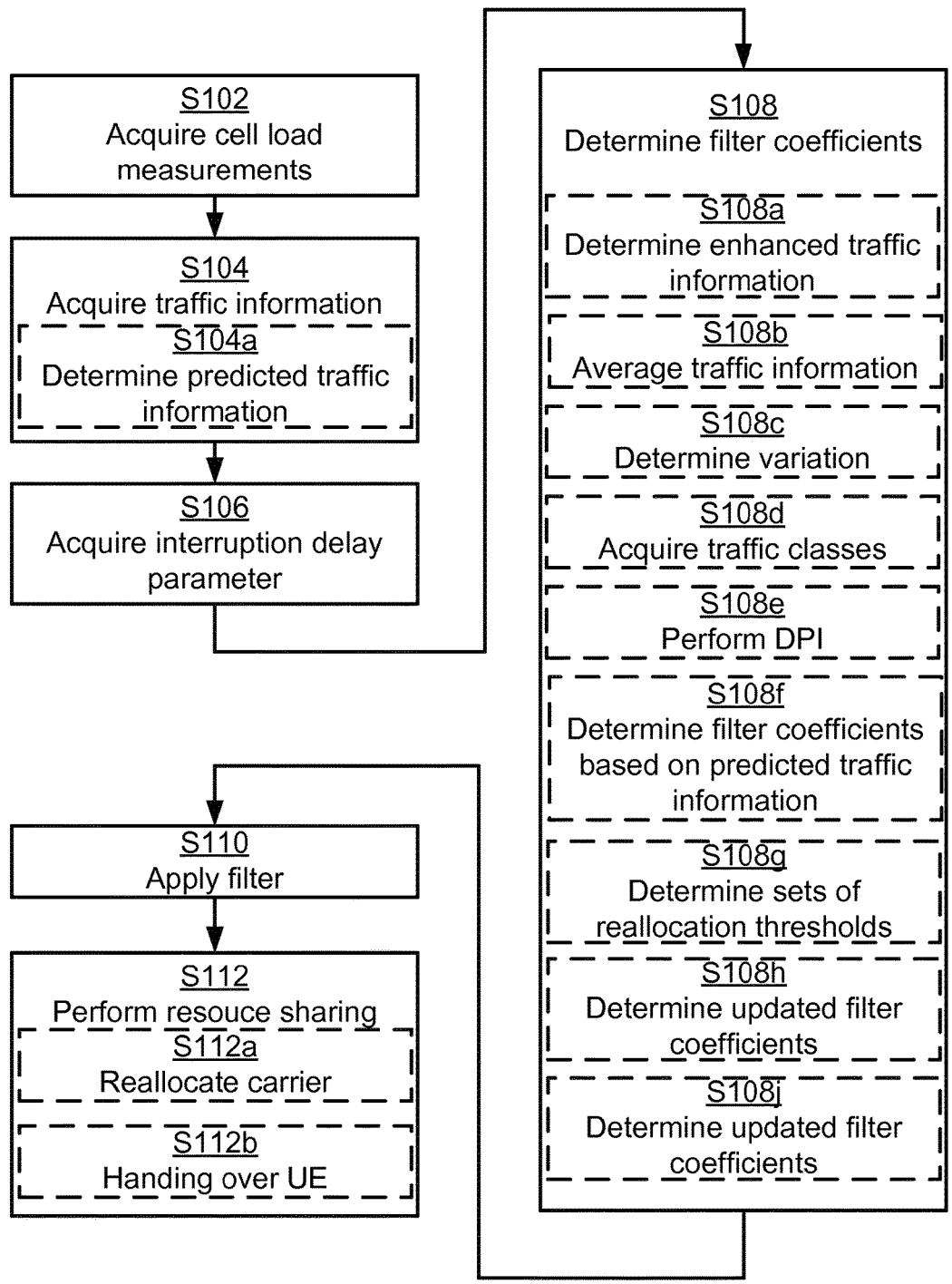

FIGS. 7 and 8 are flow chart illustrating embodiments of methods for adaptive resource sharing between at least two RATs in a cell 25. The methods are performed by the network node 14, 15, 17, 18, 21. The methods are advantageously provided as computer programs 33. FIG. 6 shows one example of a computer program product 32 comprising computer readable means 34. On this computer readable means 34, a computer program 33 can be stored, which computer program 33 can cause the processing unit 31 and thereto operatively coupled entities and devices, such as the communications interface 26, the storage medium 27, the transmitter 29 and the receiver 28 to execute methods according to embodiments described herein. The computer program 33 and/or computer program product 32 may thus provide means for performing any steps as herein disclosed.

In the example of FIG. 6, the computer program product 32 is illustrated as an optical disc, such as a CD (compact disc) or a DVD (digital versatile disc) or a Blu-Ray disc. The computer program product 32 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 33 is here schematically shown as a track on the depicted optical disk, the computer program 33 can be stored in any way which is suitable for the computer program product 32.

Reference is now made to FIG. 7 illustrating a method for adaptive resource sharing between at least two radio access technologies (RATs) in a cell 25 according to an embodiment. The method is performed by a network node 14, 15, 17, 18, 21.

The method is thus based on applying an adaptive filter to the load measurement, where the filter coefficients of the adaptive filter are based on traffic type and user equipment (UE) capability of UEs in the cell.

In general terms, the network node 14, 15, 17, 18, 21 is configured to acquire different types of data in a cell 25. At least data relating to cell load measurements, traffic information, and an indicator of interruption delay parameters is acquired. Particularly, the processing unit 31 of the network node 14, 15, 17, 18, 21 is arranged to, in a step S102, acquire cell load measurements for at least two radio access technologies, RATs, in a cell 25. Particularly, the processing unit 31 of the network node 14, 15, 17, 18, 21 is arranged to, in step S104, acquire traffic information for the cell 25.

Particularly, the processing unit 31 of the network node 14, 15, 17, 18, 21 is arranged to, in a step S106, acquire an indicator of interruption delay parameters for UEs 12 in the cell 25.

A filter may then be used to determine resource sharing—the filter is applied to the traffic information. The filter has filter coefficients based on the cell load measurements and the UE interruption delay. Particularly, the processing unit 31 of the network node 14, 15, 17, 18, 21 is arranged to, in a step S108, determine filter coefficients based on the acquired traffic information and the acquired indicator. Particularly, the processing unit 31 of the network node 14, 15, 17, 18, 21 is arranged to, in a step S110, apply a filter with the filter coefficients to the cell load measurements.

Resource sharing is then performed between the RATs. Particularly, the processing unit 31 of the network node 14, 15, 17, 18, 21 is arranged to, in a step S112, perform resource sharing between the at least two RATs based on the filtered cell load measurements.

Figure 1:
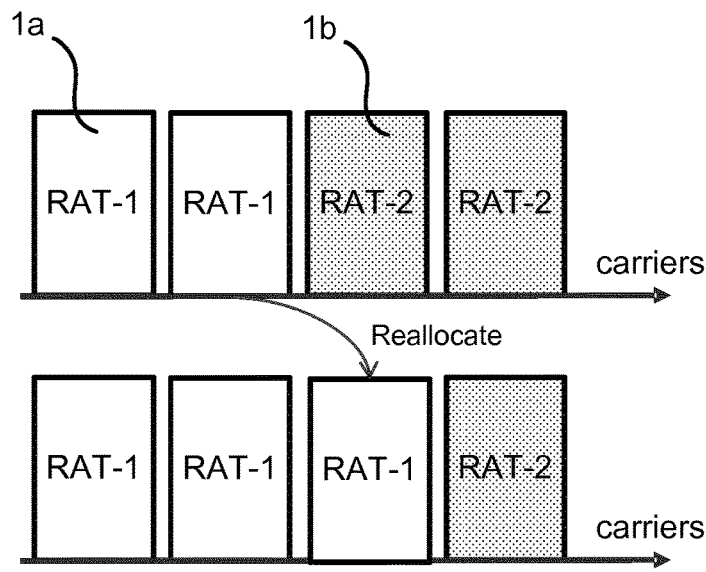
FIG. 1 schematically illustrates resource reallocation.
Figure 2:
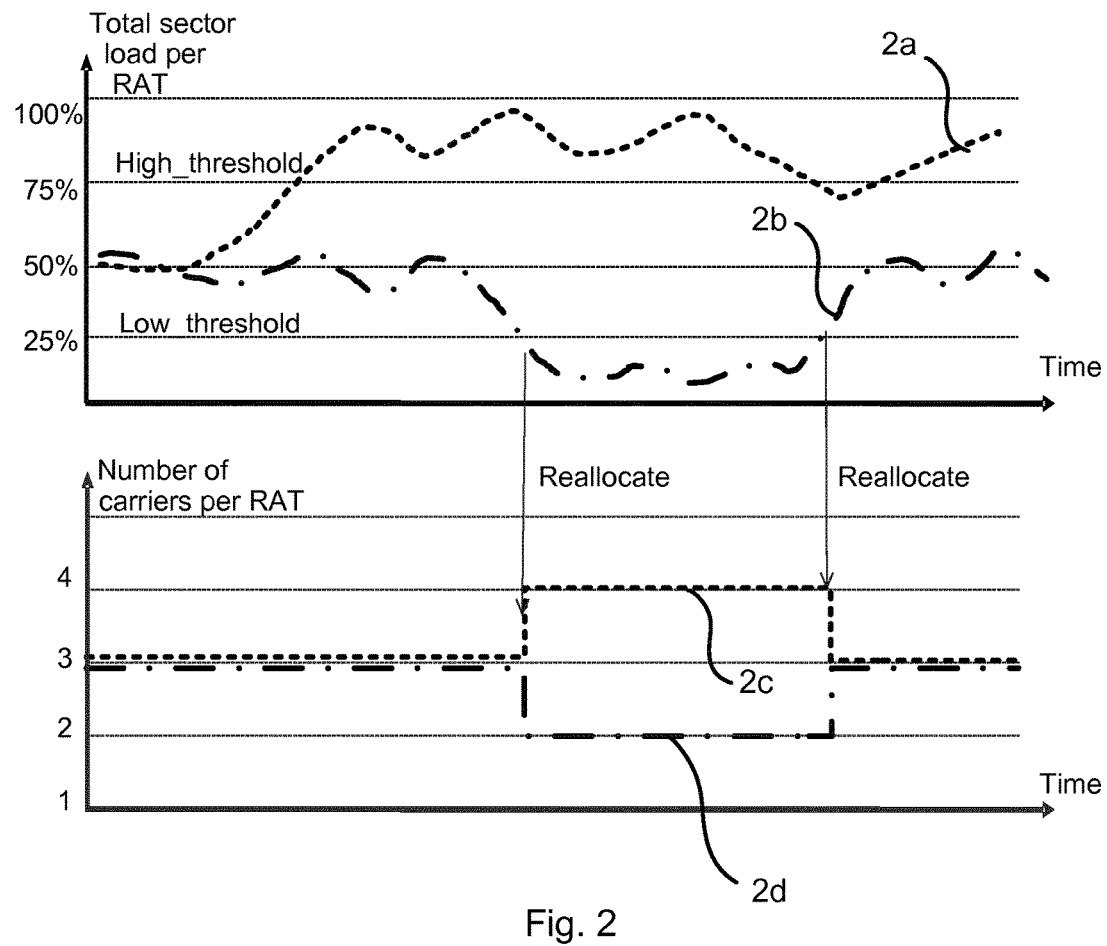
FIG. 2 schematically illustrates traffic variations and resource reallocation.
Figure 3:
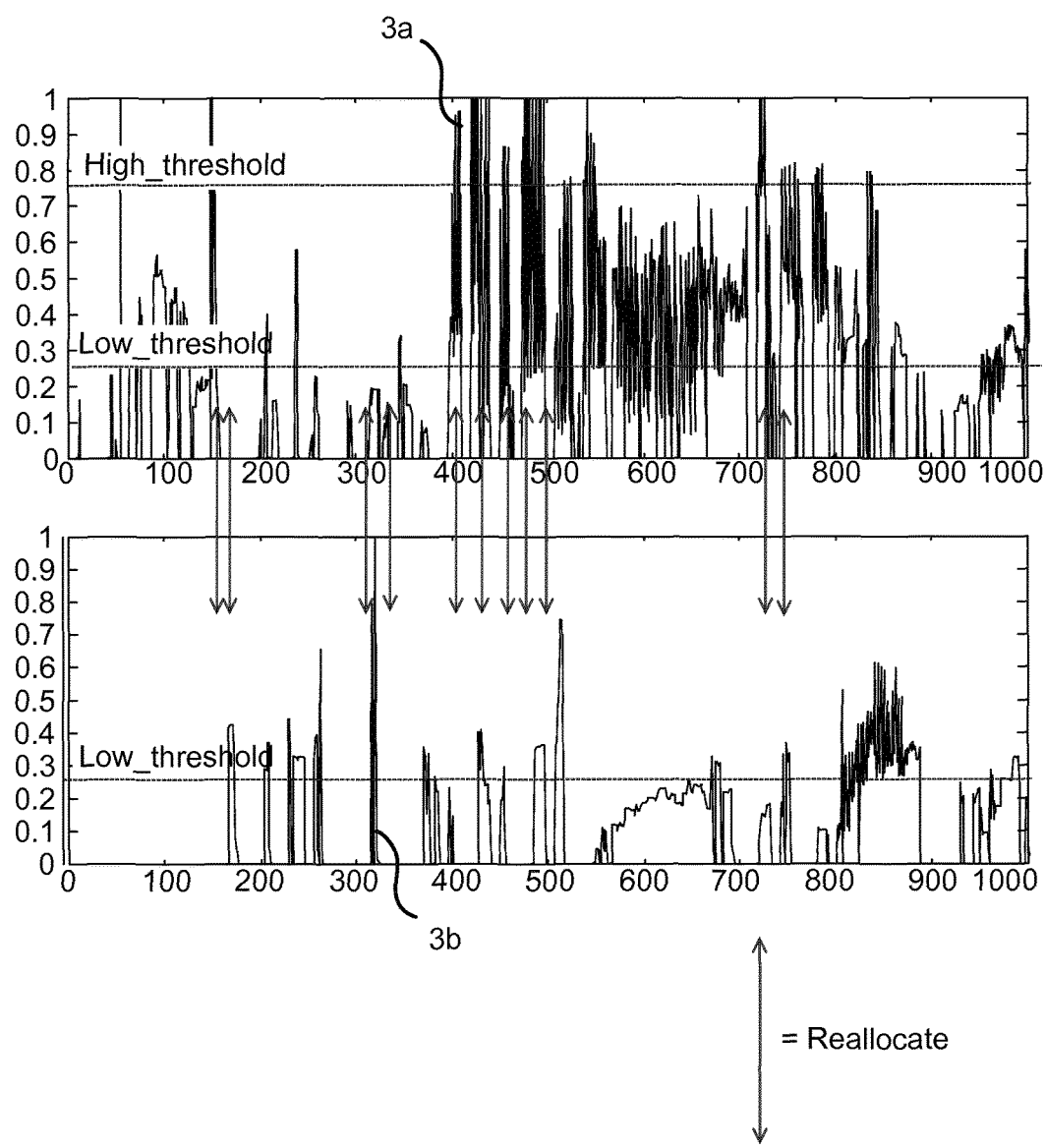
FIG. 3 schematically illustrates traffic variations and resource reallocation.
Figure 10:
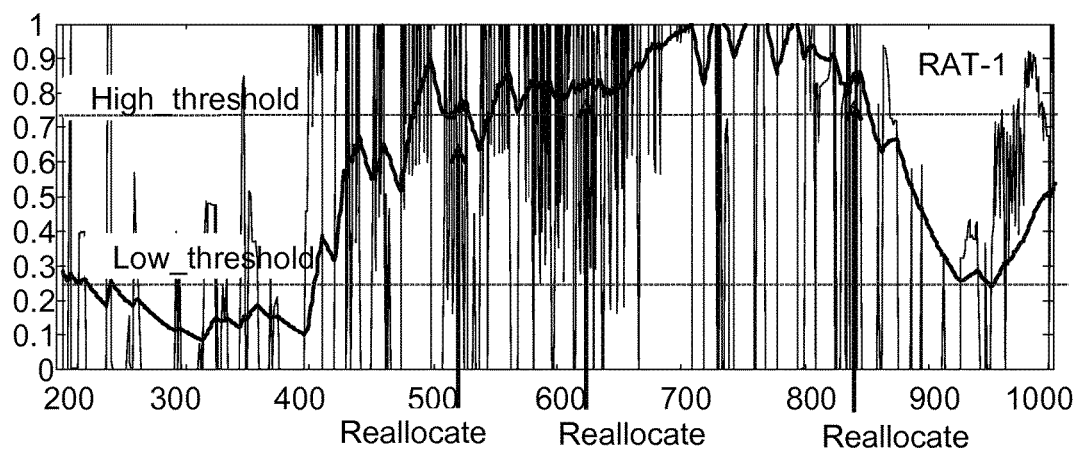
FIG. 10 schematically illustrates traffic variations and resource reallocation according to an embodiment.
Figure 10:
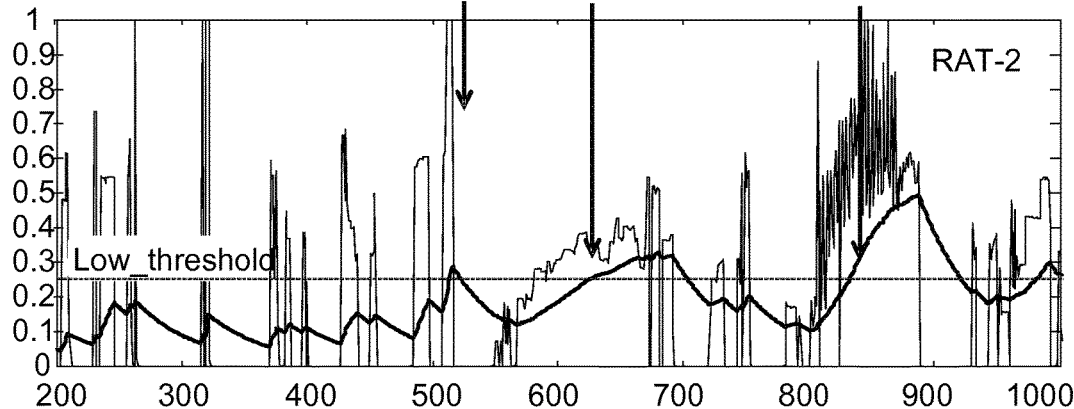

FIG. 10 shows an example of filtering the cell load of web traffic users from FIG. 3 according to steps S102-S112. As can be seen the number of bandwidth reallocations in FIG. 10 is substantially reduced compared to FIG. 3. There may be different types of indicators of interruption delay parameters. For example, the indicator of interruption delay parameters may be based on at least one of a radio link failure parameter, a UE category parameter, and actual measured interruption delay for the UEs in the cell. These indicators of interruption delay parameters will be further disclosed below.

Embodiments relating to further details of mechanisms for adaptive resource sharing between at least two RATS in a cell 25 will now be disclosed. Reference is now made to FIG. 8 illustrating methods for adaptive resource sharing between at least two RATS in a cell 25 according to further embodiments.

There may be different ways to perform resource sharing as in step S112. Different embodiments relating thereto will now be described in turn. For example, the resource sharing may involve at least one of spectrum sharing and bandwidth reallocation of the UEs.

For example, the resource sharing may involve bandwidth reallocation from one RAT to another RAT. Thus, according to an embodiment performing the resource sharing comprises the processing unit 31 of the network node 14, 15, 17, 18, 21 to, in an optional step S112a, reallocate at least one carrier for serving the UEs 12 in the cell 25 from a first RAT of the at least two RATs to a second RAT of the at least two RATs.

Figure 13:
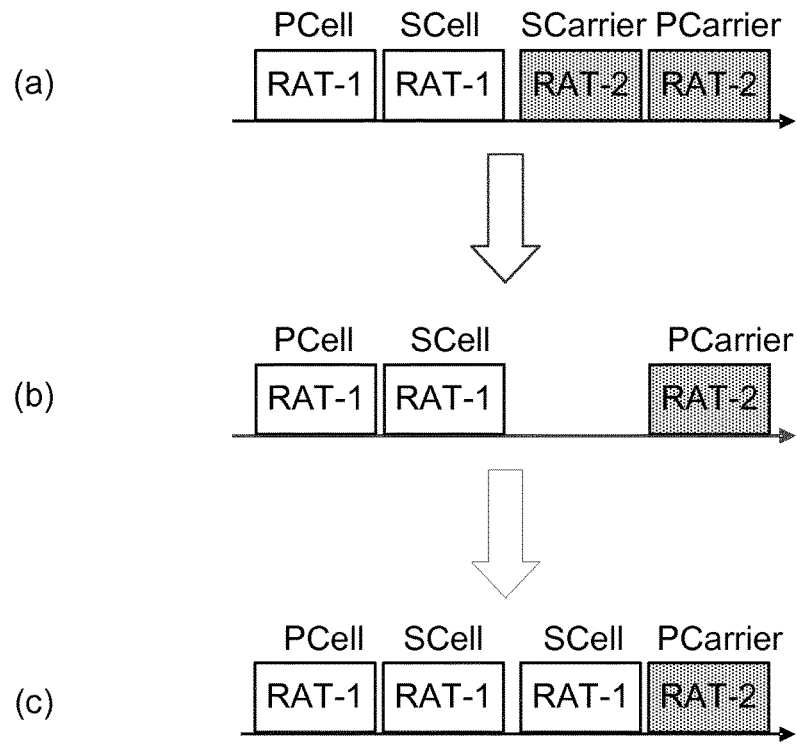
FIGS. 13 and 14 schematically illustrate spectrum allocation according to embodiments.
Figure 14:
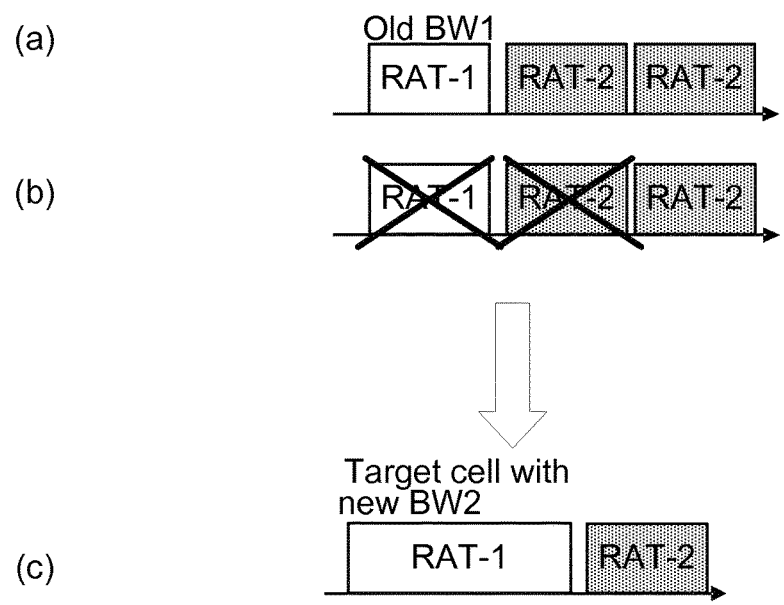

FIGS. 13, and 14 schematically illustrate examples of spectrum allocation between a first RAT ("RAT-1") and a second RAT ("RAT-2") according to embodiments. RAT-1 and RAT-2 use the same frequency band. FIG. 13 schematically illustrates an example where RAT-1 and RAT-2 utilize carrier aggregation and/or multi carrier. The example shows when one carrier of RAT-1 replaces a one carrier of RAT-2 by turning on and off certain carriers. In the top part (a) of FIG. 13 a frequency band is shared between a carrier of a primary serving cell (PCell) using RAT-1, a carrier of a secondary serving cell (SCell) using RAT-1, a carrier of a PCell using RAT-2, and a carrier of a SCell using RAT-1. In the middle part (b) of FIG. 13 the carrier of the SCell using RAT-2 has been removed. In the bottom part (c) of FIG. 13 a further carrier for a SCell using RAT-1 has been allocated where the secondary carrier using RAT-2 was previously located.

FIG. 14 schematically illustrates an example where RAT-1 and RAT-2 are sharing the same frequency band. FIG. 14 shows an example of how to reallocate the spectrum between RAT-1 and RAT-2 without using carrier aggregation and/or multi-carrier. One carrier of RAT-1 and one carrier of RAT-2, each with bandwidth "BW1", are replaced by one carrier of RAT-1 with bandwidth "BW2" wider than "BW1". In the top part (a) of FIG. 14 a frequency band is shared between one carrier of RAT-1, and two carriers of RAT-2. Each carrier has a bandwidth "BW". In the middle part (b) of FIG. 14 the carrier of RAT-1 and one carrier of RAT-2 have been removed. In the bottom part (c) of FIG. 14 a new carrier of RAT-1 with bandwidth BW2 has been allocated where the removed RAT-1 and RAT-2 carriers were previously located.

For example, the resource sharing may involve handing over UEs from one RAT to another RAT. Thus, according to an embodiment performing the resource sharing comprises the processing unit 31 of the network node 14, 15, 17, 18, 21 to, in an optional step S112b, handing over at least one UE of the UEs in the cell from a first RAT of the at least two RATs to a second RAT of the at least two RATs.

According to an embodiment the processing unit 31 of the network node 14, 15, 17, 18, 21 is arranged to, in an optional step S108a, determine enhanced traffic information for the cell. The filter coefficients may then be based on the enhanced traffic information for the cell. According to an embodiment step S108a is performed prior to determining the filter coefficients in step S108.

There may be different ways to determine enhanced traffic information for the cell as in step S108a. For example, the processing unit 31 of the network node 14, 15, 17, 18, 21 may be arranged to, in an optional step S108b, average traffic information for the cell over a predetermined time interval. For example, the processing unit 31 of the network node 14, 15, 17, 18, 21 may be arranged to, in an optional step S108c determine a variation of the traffic information for the cell over a predetermined time interval. For example, the processing unit 31 of the network node 14, 15, 17, 18, 21 may be arranged to, in an optional step S108d acquire traffic classes for the UEs in the cell. For example, the processing unit 31 of the network node 14, 15, 17, 18, 21 may be arranged to, in an optional step S108e perform deep packet inspection (DPI) of UE traffic packets in the cell. The enhanced traffic information may be determined based on a combination any of steps S108b-S108e. Different examples relating to the above determined types of enhanced traffic information will now be disclosed in more detail.

A broad estimation of variability may be obtained through classification of the UEs into traffic classes (e.g., by DPI). In general terms, the different traffic classes are defined to have different variability (which may be estimated beforehand) which may be used to estimate the traffic variability of the UEs. For example, if the DPI measurements indicate that all UEs in the cell are engaged in chatty applications this would map to high variability while if there are some UEs that are downloading large data content (or streaming video content) this would map to a less variable traffic situation. However, in general terms, this type of variance estimation may be regarded as coarse and may only map the variability into broad traffic classes, such as high, medium or low traffic variability.

A more detailed estimation of the traffic variability may be obtained by using a filtered sample variance ($s_t^2$) of the cell load at time t, where $$s_t^2 = \frac{1}{n}\sum_{i=t-n}^{t}(x_i - \bar{x}_t)^2$$

In this expression $x_i$ is the cell load measurement at time i and $\bar{x}_t$ is the filtered mean of the cell load at time t given by $$\bar{x}_t = \frac{1}{n}\sum_{i=t-n}^{t} x_i$$

Hence, $\bar{x}_t$ considers the cell load over an interval of length n. The factor n may be variable and selected based on desired filter response time. Further considerations regarding how to determine the filter response time will be provided below. The filtered sample variance may be regarded as a precise measure of variability and may be used to tune the filter coefficients at a high frequency.

Further information that may be obtained e.g., from DPI, enables determination of when UEs are about to end their sessions. This will indicate a coming drop in the cell load. Such information may be further used to aid the reallocation decision.

There are different ways to determine the interruption delay of the UEs. Two examples will be provided next. One example includes using the UE categories of UEs in the cell are. This may indicate e.g., if the UEs are carrier aggregation (CA)/multi carrier (MC) capable or not. Another example involves measuring the actual delay that is obtained for the current mix of UEs in the cell. The first example and the second example may be combined, for example such that known UE categories are used as an initial estimate of the interruption time and the actual measured interruption time is used to further improve the initial estimate. The UE category parameter may thus relate to at least one of CA capability and MC capability of UEs in the cell.

For UEs without CA capability (or MC capability), a spectrum reallocation may be performed by forcing UEs into radio link failure (RLF). Thereafter the UEs make a reestablishment to a new cell with new bandwidth. This leads to a transmission interruption of 200-1000 ms. For UEs with CA the interruption time is negligible. High Speed Packet Access (HSPA) enabled UEs may perform inter-frequency handovers which also involves some interruption (but less than 100 ms). Thus, the average interruption delay in a cell will vary over time and generally depends on current UE distribution, i.e. the fraction of CA capable and MC HSPA enabled UEs. Hence according to an embodiment the filter coefficients are based on a relation between the number of CA capable UEs and MC capable UEs and the number of non-CA capable UEs and non-MC capable UEs in the cell.

Figure 11:
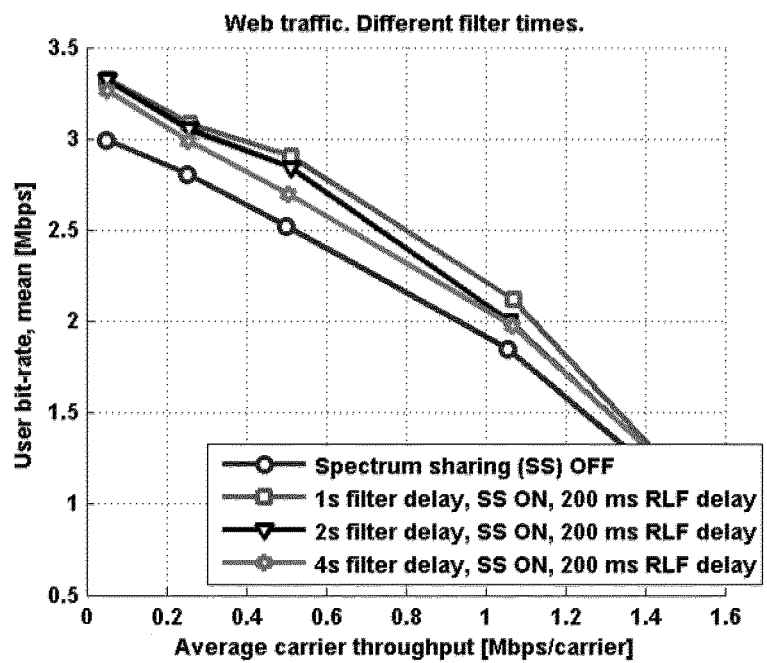
FIGS. 11 and 12 schematically illustrate user bitrate as a function of average carrier throughput with and without spectrum sharing according to embodiments.
Figure 12:
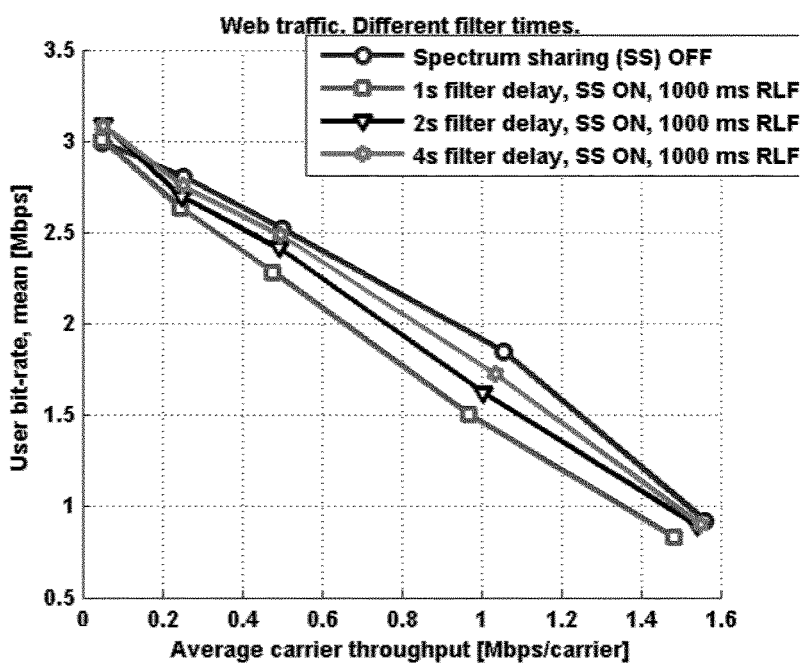

For example, the filter coefficients may be determined based on the UE capability. The UE capability may involve the UE interruption delay when a reallocation happens. FIGS. 11 and 12 show the user bitrate as a function of average carrier throughput with and without spectrum sharing. For the spectrum sharing results a filter has been applied, as in step S110. For the spectrum sharing results filters with different filter response times have been applied. Further consideration regarding how to determine the filter response time will be presented below. FIG. 11 shows an illustrative example where the interruption delay (RLF delay in the legend) is 200 ms. FIG. 12 shows an illustrative example where the interruption delay (RLF delay in the legend) is 1000 ms. As can be seen, with a relatively short interruption delay the filter should be fast; a 1 second filter response time or faster yields the highest throughput. On the other hand, for UEs have a long interruption time (1000 ms), the filter response time should be 4 seconds (or longer).

There may be further different ways to determine filter coefficients based on the acquired traffic information and the acquired indicator as in step S108. Different embodiments relating thereto will now be described in turn.

For example, the filter coefficients may be determined based on predicted future traffic information/variation. According to an embodiment the processing unit 31 of the network node 14, 15, 17, 18, 21 is arranged to, in an optional step S104a, determine predicted traffic information for the cell. The predicted traffic information is based on at least the acquired traffic information for the cell. The filter coefficients may then be based on the predicted traffic information. Thus, according to an embodiment the processing unit 31 of the network node 14, 15, 17, 18, 21 is arranged to, in an optional step S108f, determine the filter coefficients based also on the predicted traffic information.

Each one of the at least two RATs may be associated with a set of reallocation thresholds (denoted "High_threshold" and "Low_threshold" in FIG. 10). The resource sharing may then be based on the sets of reallocation thresholds. For example, when the filtered cell load measurements of one RAT is above the "High_threshold", and the filtered cell load measurements of the other RAT is below the "Low_threshold", a spectrum reallocation may be performed. For example, the reallocation thresholds may be adapted based on traffic information/variance. According to an embodiment the processing unit 31 of the network node 14, 15, 17, 18, 21 is therefore arranged to, in an optional step S108g, determine the sets of reallocation thresholds based on the traffic information for the cell.

For example, updated filter coefficients may be dependent on current filter coefficients. There may be different ways of determining the updated filter coefficients based on the current filter coefficients.

For example, a slower filter may be used if the traffic variance increases or if UE interruption delay increases. Particularly, according to an embodiment the processing unit 31 of the network node 14, 15, 17, 18, 21 is arranged to, in an optional step S108*h*, determine updated filter coefficients to generate a filter response time slower than that of the current filter coefficients. Filter coefficients generating such slower filter response time may be generated until a lower filter response time limit has been reached. Step S108*h* may be performed either if a variation of the traffic variation increases or if the interruption delay parameter increases.

For example, a faster filter may be used if traffic variance decreases or if UE interruption delay decreases. Particularly, according to an embodiment the processing unit 31 of the network node 14, 15, 17, 18, 21 is arranged to, in an optional step S108*j*, determine updated filter coefficients to generate a filter response time faster than that of the current filter coefficients. Filter coefficients generating such faster filter response time may be generated until an upper filter response time limit has been reached. Step S108*j* may be performed either if a variation of the traffic variation decreases or if the interruption delay parameter decreases.

Alternatively the updated filter coefficients may be independent from previous filter coefficients.

For example, a slow filter may be used if the traffic variance is high or if the UE interruption delay is low. For example, a fast filter may be used if the traffic variance is low or if the UE interruption delay is low. Particularly, the filter coefficients may be determined to generate a first filter response time in a case a variation of the traffic information for the cell over a predetermined time is above a first threshold value (Thr_1). The filter coefficients may further be determined to generate the first filter response time in a case the indicator is below a second threshold value (Thr_2). Particularly, the filter coefficients may be determined to generate a second filter response time in a case the variation is not above the first threshold value. The filter coefficients may further be determined to generate the second filter response time in a case the indicator is not below the second threshold value. The first filter response time is longer than the second filter response time.

For example, a slow filter may be used if traffic variance is high or if UE interruption delay is low. According to an embodiment the filter coefficients are determined to generate a filter response time of at least about 4 seconds in a case a variation of the traffic information for the cell over a predetermined time is above a first threshold value or in a case the indicator is below a second threshold value. For example, a fast filter may be used if traffic variance is low or if UE interruption delay is low. The fast filter is faster than the slow filter. According to an embodiment the filter coefficients are determined to generate a filter response time of at most about 4 seconds in a case the variation is not above the first threshold value or in a case the indicator is not below the second threshold value.

Figure 9:
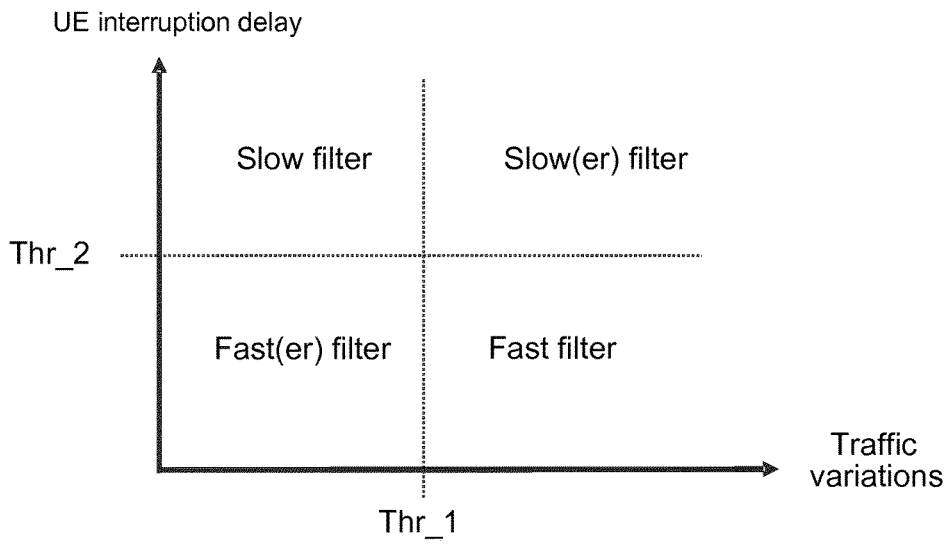
FIG. 9 schematically illustrates filter selection according to an embodiment.

FIG. 9 schematically illustrates filter selection according to an embodiment. Particularly, FIG. 9 schematically illustrates how to select the filter coefficients as a function of traffic variations and UE interruption delay.

The filter coefficients may be used to define one filter. Alternatively the filter coefficients may be used to define at least two filters. For example, each one of the at least two RATs may be associated with its own set of filters. Hence, in step S110 a first filter associated with RAT-1 may be applied to the cell load measurements for UEs using RAT-1 and a second filter associated with RAT-2 may be applied to the cell load measurements for UEs using RAT-2.

In summary, it has by the inventors of the enclosed embodiments been found that spectrum sharing and bandwidth reallocation are beneficial for traffic with relatively low traffic variations or if the UEs can make a fast reallocation, but not with a very fast traffic variations and UEs with slow reallocations.

According to embodiments disclosed herein the spectrum/bandwidth reallocations between two RATs in the same cell is adapted based on, for example, the UE capability and the type of data traffic in the cell.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for adaptive resource sharing between at least a first radio access technology (RAT) being used in a cell and a second RAT being used in the cell, the method comprising:
   acquiring first cell load measurements associated with the first RAT;
   acquiring second cell load measurements associated with the second RAT;
   acquiring traffic information for said cell;
   acquiring an indicator of interruption delay parameters for user equipments (UEs) in said cell;
   determining filter coefficients based on said acquired traffic information and said acquired indicator;
   applying a filter with said filter coefficients to said first and second cell load measurements; and
   performing resource sharing between at least the first and second RATs based on said filtered cell load measurements.

2. The method of claim 1, wherein said indicator of interruption delay parameters is based on at least one of a radio link failure parameter, a UE category parameter, and actual measured interruption delay for said UEs in said cell.

3. The method of claim 2, wherein said UE category parameter relates to at least one of a carrier aggregation, CA, capability and multi carrier, MC, capability of UEs in said cell.

4. The method of claim 1, further comprising, prior to determining said filter coefficients, determining enhanced traffic information for said cell, and wherein said filter coefficients are based on said enhanced traffic information for said cell, wherein determining enhanced traffic information comprises at least one of:
   averaging traffic information for said cell over a predetermined time interval;
   determining a variation of said traffic information for said cell over a predetermined time interval;
   acquiring traffic classes for said UEs in said cell; and
   performing deep packet inspection, DPI, of UE traffic packets in said cell.

5. The method of claim 1, wherein said filter coefficients are used to define at least two filters.

6. The method of claim 1, wherein each one of said at least two RATs is associated with its own set of filters.

7. The method of claim 1, further comprising:
   determining, based on at least said acquired traffic information for said cell, predicted traffic information for said cell; and
   determining said filter coefficients based also on said predicted traffic information.

8. The method of claim 1, wherein each one of said first and second RATs is associated with a set of reallocation thresholds, wherein said resource sharing is based on the sets of reallocation thresholds, the method further comprising:
  determining the sets of reallocation thresholds based on said traffic information for said cell.

9. The method of claim 1, wherein said filter coefficients are dependent on previous filter coefficients.

10. The method of claim 1, wherein said filter coefficients are current filter coefficients, the method further comprising, either if a variation of said traffic variation increases or if said interruption delay parameter increases:
  determining updated filter coefficients to generate a filter response time slower than that of said current filter coefficients until a lower filter response time limit has been reached.

11. The method of claim 1, wherein said filter coefficients are current filter coefficients, the method further comprising, either if a variation of said traffic variation decreases or if said interruption delay parameter decreases:
  determining updated filter coefficients to generate a filter response time faster than that of said current filter coefficients until an upper filter response time limit has been reached.

12. The method of claim 1, wherein said filter coefficients are independent from previous filter coefficients.

13. The method of claim 1, wherein said filter coefficients are determined to generate a first filter response time in a case a variation of said traffic information for said cell over a predetermined time is above a first threshold value (Thr_1) or in a case said indicator is below a second threshold value (Thr_2), wherein said filter coefficients are determined to generate a second filter response time in a case said variation is not above said first threshold value or in a case said indicator is not below said second threshold value, and wherein said first filter response time is longer than said second filter response time.

14. The method of claim 1, wherein said filter coefficients are determined to generate a filter response time of at least 4 seconds in a case a variation of said traffic information for said cell over a predetermined time is above a first threshold value or in a case said indicator is below a second threshold value.

15. The method of claim 14, wherein said filter coefficients are determined to generate a filter response time of at most 4 seconds in a case said variation is not above said first threshold value or in a case said indicator is not below said second threshold value.

16. The method of claim 1, wherein resource sharing comprises at least one of spectrum sharing and bandwidth reallocation of the UEs.

17. The method of claim 1, wherein
  the method further includes, prior to performing said resource sharing, allocating a carrier for serving the UEs in said cell to the first RAT, and
  performing said resource sharing comprises:
  reallocating said carrier from the first RAT to the second RAT.

18. The method of claim 1, wherein performing said resource sharing comprises:
  handing over at least one UE of the UEs in said cell from a base station employing the first RAT to a base station employing the second RAT.

19. The method of claim 1, wherein said filter coefficients are based on a relation between a number of carrier aggregation capable UEs and multi carrier capable UEs and a number of non-carrier aggregation capable UEs and non-multi carrier capable UEs in said cell.

20. A network node apparatus for adaptive resource sharing between at least two radio access technologies in a cell, the network node apparatus comprising:
  a memory; and
  a processing unit coupled to the memory, the processing unit being arranged to:
  acquire first cell load measurements associated with the first RAT;
  acquire second cell load measurements associated with the second RAT;
  acquire traffic information for said cell;
  acquire an indicator of interruption delay parameters for user equipments (UEs) in said cell;
  determine filter coefficients based on said acquired traffic information and said acquired indicator;
  apply a filter with said filter coefficients to said first and second cell load measurements; and
  perform resource sharing between at least the first and second RATs based on said filtered cell load measurements.

21. A computer program product comprising a non-transitory computer readable medium storing a computer program for adaptive resource sharing between at least two radio access technologies in a cell, the computer program comprising computer program code which, when executed by a processing unit comprising one or more processors, causes the processing unit to:
  acquire first cell load measurements associated with the first RAT;
  acquire second cell load measurements associated with the second RAT;
  acquire traffic information for said cell;
  acquire an indicator of interruption delay parameters for user equipments (UEs) in said cell;
  determine filter coefficients based on said acquired traffic information and said acquired indicator;
  apply a filter with said filter coefficients to said first and second cell load measurements; and
  perform resource sharing between at least the first and second RATs based on said filtered cell load measurements.

22. The computer program product of claim 21, wherein the computer program further comprises computer program code for determining enhanced traffic information for said cell prior to determining said filter coefficients.

* * * * *